(12) United States Patent
Liu (10) Patent No.: US 12,314,866 B2
(45) Date of Patent: May 27, 2025

(54) PARALLEL PROCESSING OF NETWORK MODEL OPERATIONS

(71) Applicant: SHANGHAI CAMBRICON INFORMATION TECHNOLOGY CO., LTD, Shanghai (CN)

(72) Inventor: Shaoli Liu, Shanghai (CN)

(73) Assignee: SHANGHAI CAMBRICON INFORMATION TECHNOLOGY CO., LTD, Shanghai (CN)

( * ) Notice: Subject to any disclaimer, the term of this patent is extended or adjusted under 35 U.S.C. 154(b) by 1111 days.

(21) Appl. No.: 17/138,334

(22) Filed: Dec. 30, 2020

(65) Prior Publication Data

US 2021/0117810 A1 Apr. 22, 2021

Related U.S. Application Data

(63) Continuation-in-part of application No. PCT/CN2019/092805, filed on Jun. 25, 2019.

(30) Foreign Application Priority Data

Jul. 17, 2018 (CN) .......................... 201810782174.6

(51) Int. Cl.
*G06F 7/57* (2006.01)
*G06F 11/36* (2025.01)
(Continued)

(52) U.S. Cl.
CPC ................. *G06N 5/02* (2013.01); *G06F 7/57* (2013.01); *G06F 11/3636* (2013.01); *G06N 3/063* (2013.01); *G06N 3/08* (2013.01)

(58) Field of Classification Search
None
See application file for complete search history.

(56) References Cited

U.S. PATENT DOCUMENTS 4,939,642 A * 7/1990 Blank ................. G06F 15/8023
712/22
5,052,043 A 9/1991 Gaborski
(Continued)

FOREIGN PATENT DOCUMENTS

CN 1503858 A 6/2004
CN 1503958 A 6/2004
(Continued)

OTHER PUBLICATIONS

'Placement and Interconnection of Systolic Processing Elements: A New Lu Decomposition Algorithm' by Marina C. Chen, Oct. 1986. (Year: 1986).*

(Continued)

*Primary Examiner* — Steven G Snyder
(74) *Attorney, Agent, or Firm* — Rimon PC (57) ABSTRACT

The present application relates to an operation device and an operation method. The operation device includes a plurality of operation modules. The plurality of operation modules complete an operation of a network model by executing corresponding computational sub-commands in parallel. Each operation module includes at least one operation unit configured to execute a first computational sub-command using first computational sub-data; and a storage unit configured to store the first computational sub-data. The first computational sub-data includes data needed for executing the first computational sub-command. The embodiments of the present application reduces bandwidth requirements for data access and reduces computation and equipment costs.

12 Claims, 5 Drawing Sheets

(51) Int. Cl.
  *G06F 11/362* (2025.01)
  *G06N 3/063* (2023.01)
  *G06N 5/02* (2023.01)
  *G06N 3/08* (2023.01)

(56) References Cited

U.S. PATENT DOCUMENTS

| | | | |
|---|---|---|---|
| 5,361,367 A * | 11/1994 | Fijany | G06F 15/8015 712/15 |
| 5,790,880 A * | 8/1998 | Ireton | G06F 9/3885 712/E9.046 |
| 6,144,977 A | 11/2000 | Giangarra et al. | |
| 6,452,149 B1 * | 9/2002 | Yamashita | H01L 27/14643 348/294 |
| 6,671,796 B1 | 12/2003 | Sudharsanan et al. | |
| 6,715,065 B1 | 3/2004 | Ebata et al. | |
| 6,928,535 B2 * | 8/2005 | Yamashita | H10F 39/18 712/225 |
| 6,931,639 B1 | 8/2005 | Eickemeyer | |
| 7,236,995 B2 | 6/2007 | Hinds | |
| 7,242,414 B1 | 7/2007 | Thekkath et al. | |
| 7,406,451 B2 | 7/2008 | Mrziglod et al. | |
| 7,721,128 B2 | 5/2010 | Johns et al. | |
| 7,945,607 B2 | 5/2011 | Hinds | |
| 8,051,117 B2 | 11/2011 | Lundvall et al. | |
| 8,106,912 B2 * | 1/2012 | Koga | G06F 9/345 345/505 |
| 8,190,664 B2 | 5/2012 | Lundvall et al. | |
| 8,560,591 B2 | 10/2013 | Lundvall et al. | |
| 8,694,572 B2 | 4/2014 | Samy et al. | |
| 8,730,248 B2 * | 5/2014 | Sasaki | G06T 1/20 345/503 |
| 8,762,438 B2 | 6/2014 | Lundvall et al. | |
| 8,924,455 B1 | 12/2014 | Barman et al. | |
| 8,949,550 B2 * | 2/2015 | Choi | G06F 15/7871 709/213 |
| 9,412,366 B2 | 8/2016 | Wilensky et al. | |
| 9,916,531 B1 | 3/2018 | Zivkovic et al. | |
| 10,187,568 B1 | 1/2019 | Tran et al. | |
| 10,191,881 B2 * | 1/2019 | Goh | G06F 13/4068 |
| 10,224,954 B1 | 3/2019 | Madduri et al. | |
| 10,360,304 B1 | 7/2019 | Alvarez et al. | |
| 10,372,507 B2 * | 8/2019 | Venkatesh | G06T 1/20 |
| 10,427,306 B1 | 10/2019 | Quinlan et al. | |
| 10,656,942 B2 | 5/2020 | Madduri et al. | |
| 10,929,744 B2 | 2/2021 | Li et al. | |
| 11,568,269 B2 * | 1/2023 | Du | G06F 9/3889 |
| 2002/0138714 A1 | 9/2002 | Leibholz et al. | |
| 2003/0167460 A1 | 9/2003 | Desai et al. | |
| 2004/0250164 A1 | 12/2004 | Ahmad et al. | |
| 2005/0138327 A1 | 6/2005 | Tabei | |
| 2006/0161375 A1 | 7/2006 | Duberstein et al. | |
| 2007/0220076 A1 | 9/2007 | Hinds | |
| 2007/0273699 A1 * | 11/2007 | Sasaki | G06F 9/3879 345/502 |
| 2008/0148120 A1 | 6/2008 | Seuring | |
| 2009/0106528 A1 * | 4/2009 | Koga | G06T 1/20 712/22 |
| 2009/0113186 A1 | 4/2009 | Kato et al. | |
| 2009/0125293 A1 | 5/2009 | Lefurgy et al. | |
| 2010/0073068 A1 | 3/2010 | Cho et al. | |
| 2011/0060587 A1 | 3/2011 | Phillips et al. | |
| 2011/0301777 A1 | 12/2011 | Cox et al. | |
| 2012/0316845 A1 | 12/2012 | Grey et al. | |
| 2013/0024621 A1 * | 1/2013 | Choi | G06F 15/7871 711/149 |
| 2013/0054110 A1 | 2/2013 | Sata | |
| 2013/0332610 A1 | 12/2013 | Beveridge | |
| 2014/0081625 A1 | 3/2014 | Wilensky et al. | |
| 2014/0164737 A1 | 6/2014 | Collange et al. | |
| 2014/0249814 A1 | 9/2014 | Nakano et al. | |
| 2015/0134581 A1 | 5/2015 | Doeding et al. | |
| 2015/0370303 A1 | 12/2015 | Krishnaswamy et al. | |
| 2016/0026231 A1 | 1/2016 | Ignowski et al. | |
| 2016/0054922 A1 | 2/2016 | Awasthi et al. | |
| 2016/0124710 A1 | 5/2016 | Lutz et al. | |
| 2016/0170866 A1 | 6/2016 | Ioualalen et al. | |
| 2016/0328645 A1 | 11/2016 | Lin et al. | |
| 2016/0328647 A1 | 11/2016 | Lin et al. | |
| 2017/0061279 A1 | 3/2017 | Yang et al. | |
| 2017/0090956 A1 | 3/2017 | Linsky | |
| 2017/0103022 A1 | 4/2017 | Kreinin et al. | |
| 2017/0142327 A1 | 5/2017 | Bayani | |
| 2017/0161604 A1 | 6/2017 | Craddock et al. | |
| 2017/0221176 A1 | 8/2017 | Munteanu et al. | |
| 2017/0257079 A1 | 9/2017 | Jain et al. | |
| 2017/0262959 A1 | 9/2017 | Lee et al. | |
| 2017/0316307 A1 | 11/2017 | Koster et al. | |
| 2017/0316312 A1 | 11/2017 | Goyal et al. | |
| 2017/0344882 A1 | 11/2017 | Ambrose et al. | |
| 2017/0353163 A1 | 12/2017 | Gazneli et al. | |
| 2017/0357530 A1 | 12/2017 | Shih et al. | |
| 2017/0357910 A1 | 12/2017 | Sommer et al. | |
| 2018/0046903 A1 | 2/2018 | Yao et al. | |
| 2018/0088996 A1 | 3/2018 | Rossi et al. | |
| 2018/0096243 A1 | 4/2018 | Patil et al. | |
| 2018/0157464 A1 | 6/2018 | Lutz et al. | |
| 2018/0288440 A1 | 10/2018 | Chao | |
| 2018/0293517 A1 | 10/2018 | Browne et al. | |
| 2018/0300931 A1 | 10/2018 | Vembu et al. | |
| 2018/0322391 A1 | 11/2018 | Wu et al. | |
| 2018/0357541 A1 | 12/2018 | Chen et al. | |
| 2018/0367729 A1 | 12/2018 | Parasnis et al. | |
| 2018/0367976 A1 | 12/2018 | Woo | |
| 2019/0026250 A1 * | 1/2019 | Das Sarma | G06F 9/30038 |
| 2019/0034784 A1 | 1/2019 | Li et al. | |
| 2019/0042925 A1 | 2/2019 | Choe et al. | |
| 2019/0050710 A1 | 2/2019 | Wang et al. | |
| 2019/0057696 A1 | 2/2019 | Ogawa | |
| 2019/0114142 A1 | 4/2019 | Yoda et al. | |
| 2019/0122094 A1 | 4/2019 | Chen et al. | |
| 2019/0122119 A1 | 4/2019 | Husain | |
| 2019/0138372 A1 | 5/2019 | Tee | |
| 2019/0164285 A1 | 5/2019 | Nye et al. | |
| 2019/0180170 A1 | 6/2019 | Huang et al. | |
| 2019/0199370 A1 | 6/2019 | Madduri et al. | |
| 2019/0205737 A1 | 7/2019 | Bleiweiss et al. | |
| 2019/0205746 A1 | 7/2019 | Nurvitadhi et al. | |
| 2019/0220734 A1 | 7/2019 | Ferdman et al. | |
| 2019/0228762 A1 | 7/2019 | Wang et al. | |
| 2019/0251429 A1 | 8/2019 | Du et al. | |
| 2019/0265949 A1 | 8/2019 | Ito | |
| 2019/0278677 A1 | 9/2019 | Terechko et al. | |
| 2019/0294968 A1 | 9/2019 | Vantrease et al. | |
| 2019/0339937 A1 | 11/2019 | Lo et al. | |
| 2020/0005424 A1 | 1/2020 | Appu et al. | |
| 2020/0097799 A1 | 3/2020 | Divakar et al. | |
| 2020/0117453 A1 | 4/2020 | Zhang et al. | |
| 2020/0117614 A1 | 4/2020 | Zhang et al. | |
| 2020/0125508 A1 | 4/2020 | Liu et al. | |
| 2020/0126554 A1 | 4/2020 | Chen et al. | |
| 2020/0126555 A1 | 4/2020 | Chen et al. | |
| 2020/0142748 A1 | 5/2020 | Liu et al. | |
| 2020/0159527 A1 | 5/2020 | Zhang et al. | |
| 2020/0159530 A1 | 5/2020 | Zhang et al. | |
| 2020/0159531 A1 | 5/2020 | Zhang et al. | |
| 2020/0159532 A1 | 5/2020 | Zhang et al. | |
| 2020/0159533 A1 | 5/2020 | Zhang et al. | |
| 2020/0159534 A1 | 5/2020 | Li et al. | |
| 2020/0160162 A1 | 5/2020 | Zhang et al. | |
| 2020/0160163 A1 | 5/2020 | Liu et al. | |
| 2020/0160219 A1 | 5/2020 | Zhang et al. | |
| 2020/0160220 A1 | 5/2020 | Zhang et al. | |
| 2020/0160221 A1 | 5/2020 | Zhang et al. | |
| 2020/0160222 A1 | 5/2020 | Zhang et al. | |
| 2020/0168227 A1 | 5/2020 | Chen et al. | |
| 2020/0174547 A1 | 6/2020 | Fang et al. | |
| 2020/0183752 A1 | 6/2020 | Liu et al. | |
| 2020/0241874 A1 | 7/2020 | Chen et al. | |
| 2020/0257972 A1 | 8/2020 | Miniskar et al. | |
| 2020/0334041 A1 | 10/2020 | Zhang et al. | |
| 2020/0334522 A1 | 10/2020 | Zhang et al. | |
| 2020/0334572 A1 | 10/2020 | Zhang et al. | |

(56) References Cited

U.S. PATENT DOCUMENTS

| | | | |
|---|---|---|---|
| 2020/0387800 A1* | 12/2020 | Du | G06N 3/08 |
| 2020/0394522 A1 | 12/2020 | Liu et al. | |
| 2020/0394523 A1 | 12/2020 | Liu et al. | |
| 2021/0042889 A1 | 2/2021 | Pei | |
| 2021/0061028 A1 | 3/2021 | Da Deppo et al. | |
| 2021/0117768 A1 | 4/2021 | Liu et al. | |
| 2021/0182177 A1 | 6/2021 | Su et al. | |
| 2021/0264270 A1 | 8/2021 | Liu et al. | |
| 2021/0286688 A1 | 9/2021 | Liu et al. | |
| 2021/0334007 A1 | 10/2021 | Liu et al. | |
| 2021/0334137 A1 | 10/2021 | Zhang et al. | |
| 2021/0341989 A1 | 11/2021 | Chen et al. | |
| 2021/0374510 A1 | 12/2021 | Liu et al. | |
| 2021/0374511 A1 | 12/2021 | Liu et al. | |

FOREIGN PATENT DOCUMENTS

| | | | |
|---|---|---|---|
| CN | 1851668 A | 10/2006 | |
| CN | 101572829 A | 11/2009 | |
| CN | 102270042 A | 12/2011 | |
| CN | 102404673 A | 4/2012 | |
| CN | 102684701 A | 9/2012 | |
| CN | 102761509 A | 10/2012 | |
| CN | 102789413 A | 11/2012 | |
| CN | 102903089 A | 1/2013 | |
| CN | 102981854 A | 3/2013 | |
| CN | 103152673 A | 6/2013 | |
| CN | 104914977 A | 9/2015 | |
| CN | 105389158 A | 3/2016 | |
| CN | 103534664 A | 8/2016 | |
| CN | 105893419 A | 8/2016 | |
| CN | 105978611 A | 9/2016 | |
| CN | 106156310 A | 11/2016 | |
| CN | 106354568 A | 1/2017 | |
| CN | 106406812 A | 2/2017 | |
| CN | 106469291 A | 3/2017 | |
| CN | 106485316 A | 3/2017 | |
| CN | 106502626 A | 3/2017 | |
| CN | 106570559 A | 4/2017 | |
| CN | 106650922 A | 5/2017 | |
| CN | 106814639 A | 6/2017 | |
| CN | 106951587 A | 7/2017 | |
| CN | 106951962 A | 7/2017 | |
| CN | 106997236 A | 8/2017 | |
| CN | 107003988 A | 8/2017 | |
| CN | 107025629 A | 8/2017 | |
| CN | 107368174 A | 11/2017 | |
| CN | 107451654 A | 12/2017 | |
| CN | 107451658 A | 12/2017 | |
| CN | 107608715 A | 1/2018 | |
| CN | 107644254 A | 1/2018 | |
| CN | 107688855 A | 2/2018 | |
| CN | 107797913 A | 3/2018 | |
| CN | 108053028 A | 5/2018 | |
| CN | 104899641 B | 7/2018 | |
| CN | 108337000 A | 7/2018 | |
| CN | 108510067 A | 9/2018 | |
| CN | 108717570 A | 10/2018 | |
| CN | 109062540 A | 12/2018 | |
| CN | 109063820 A | 12/2018 | |
| CN | 109146057 A | 1/2019 | |
| CN | 109214509 A | 1/2019 | |
| CN | 109389219 A | 2/2019 | |
| CN | 109472353 A | 3/2019 | |
| CN | 109800877 A | 5/2019 | |
| CN | 109902745 | 6/2019 | |
| CN | 109934331 A | 6/2019 | |
| CN | 109993296 A | 7/2019 | |
| CN | 110059733 A | 7/2019 | |
| CN | 11055450 | 12/2019 | |
| CN | 110780845 A | 2/2020 | |
| EP | 0 789 296 A1 | 8/1997 | |
| EP | 2 703 945 A2 | 3/2014 | |
| EP | 3 106 997 A2 | 12/2016 | |
| EP | 3 407 268 A1 | 11/2018 | |
| EP | 3920026 A1 * | 12/2021 | G06F 9/4881 |
| EP | 3992863 A1 * | 5/2022 | G06F 15/8046 |
| JP | H03-075860 A | 8/1989 | |
| JP | H09-265379 A | 10/1997 | |
| JP | 2009-134433 A | 8/2012 | |
| JP | 2013-514570 A | 4/2013 | |
| JP | 2014-199464 A | 10/2014 | |
| JP | 2015-176158 A | 10/2015 | |
| JP | 2018-26114 A | 2/2018 | |
| JP | 2019-519852 A | 7/2019 | |
| WO | WO-9725670 A1 * | 7/1997 | G06F 9/3824 |
| WO | 2008/153194 A1 | 12/2008 | |
| WO | 2016/186823 A1 | 11/2016 | |
| WO | 2017/138220 A1 | 8/2017 | |
| WO | 2017/185412 A1 | 11/2017 | |
| WO | WO-2023045638 A1 * | 3/2023 | |

OTHER PUBLICATIONS

'Engineering of Massively Interconnected Computer Systems' by Michael Jenkins et al., Underwater Systems Department, Oct. 1, 1991. (Year: 1991).*

'Comparison of Internal and External Watchdog Timers' by: Eric Schlaepfer, Applications Engineer, Jun. 5, 2008. (Year: 2008).*

Chen et al., "DianNao: A Small-Footprint High-Throughput Accelerator for Ubiquitous Machine-Learning," ASPLOS '14 Proceedings of the 19th international conference on Architectural support for programming languages and operating systems, pp. 269-284, Salt Lake City, Utah, USA—Mar. 1, 2014; available: https://dl.acm.org/citation.cfm?id=2541967.

Chen et al., "A Small-Footprint Accelerator for Large-Scale Neural Networks," ACM Transactions on Computer Systems (TOCS), vol. 33, Issue 2, May 1, 2015, Article No. 6, ACM, pp. 1-27, New York, NY, USA; available: https://dl.acm. Org/citation.cfm?id=2701417.

Chen, Y., et al., "DaDianNao: A Machine-Learning Supercomputer," MICRO-47 Proceedings of the 47th Annual IEEE/ACM International Symposium on Microarchitecture, pp. 609-622, Cambridge, United Kingdom—Dec. 13, 2014; available: https://dl.acm.org/citation.cfm?id=2742217.

Luo, T., et al., "DaDianNao: A Neural Network Supercomputer," Published in: IEEE Transactions on Computers, vol. 66 , Issue: 1, pp. 73-88, Date of Publication: May 30, 2016; available: https://ieeexplore.ieee.org/document/7480791.

Liu, D., et al., "PuDianNao: A Polyvalent Machine Learning Accelerator," ASPLOS '15 Proceedings of the Twentieth International Conference on Architectural Support for Programming Languages and Operating Systems, pp. 369-381, Istanbul, Turkey—Mar. 14, 2015; available: https://dl.acm.org/citation.cfm?id=2694358.

Du, Z., et al., "ShiDianNao: Shifting Vision Processing Closer to the Sensor," ISCA '15 Proceedings of the 42nd Annual International Symposium on Computer Architecture, pp. 92-104, Portland, Oregon—Jun. 13, 2015; available: https://dl.acm.org/citation.cfm?id=2750389.

Du, Z., et al., "An Accelerator for High Efficient Vision Processing," Published in: IEEE Transactions on Computer-Aided Design of Integrated Circuits and Systems, vol. 36 , Issue: 2, Jun. 22, 2016, pp. 227-240; available: https://ieeexplore.ieee.org/document/7497562.

Liu, S., et al., "Cambricon: An Instruction Set Architecture for Neural Networks," 2016 ACM/IEEE 43rd Annual International Symposium on Computer Architecture (ISCA), Seoul, South Korea, Jun. 18, 2016; pp. 393-405, available: https://ieeexplore.ieee.org/document/7551409.

Zhang, S. et al., "Cambricon-X: An Accelerator for Sparse Neural Networks," Published in: 2016 49th Annual IEEE/ACM International Symposium on Microarchitecture (MICRO), Taipei, Taiwan, Oct. 15, 2016; 12 pages, available: https://ieeexplore.ieee.org/document/7783723.

Chen, Y., et al., "DianNao Family: Energy-Efficient Hardware Accelerators for Machine Learning," Communications of the ACM, vol. 59 Issue 11, Oct. 28, 2016, pp. 105-112, ACM New York, NY, USA; available: https://dl.acm.org/citation.cfm?id=2996864.

Vivienne Sze et al., "Efficient Processing of Deep Neural Networks: A Tutorial and Survey", arxiv.org, Cornell University Library, 201

(56) References Cited

OTHER PUBLICATIONS

Olin Library Cornell University Ithaca, NY 14853, Mar. 27, 2017 (Mar. 27, 2017), pp. 1-32, XP080759895, DOI: 10.1109/JPROC.2017.2761740.

Liu Shaoli et al., "Cambricon: An Instruction Set Architecture for Neural Networks", 2013 21st International Conference on Program Comprehension (ICPC); [International Symposium on Computer Architecture.(ISCA)], IEEE, US, Jun. 18, 2016 (Jun. 18, 2016), pp. 393-405, XP032950675, ISSN: 1063-6897, DOI: 10.1109/ISCA. 2016.42 ISBN: 978-0-7695-3174-8 [retrieved on Aug. 24, 2016].

IBM, "PowerPC Microprocessor Family: Vector/SIMD Multimedia Extension Technology Programming Environments Manual Programming Environments Manual", Aug. 22, 2005 (Aug. 22, 2005), pp. 170-171, XP055673033, Retrieved from the Internet: URL:http://math-atlas.sourceforge.net/devel/assembly/ vector_simd_pem. ppc. 2005AUG23.pdf retrieved on [Mar. 3, 2020].

Sumod Mohan, "Accuracy and Multi-Core Performance of Machine Learning Algorithms for Handwritten Character Recognition", Aug. 1, 2009 (Aug. 1, 2009), 60 pages, XP055673941, Retrieved from the Internet: URL:https://tigerprints.clemson.edu/cgi/viewcontent.cgi?article=1634&context=all theses retrieved on Mar. 5, 2020].

Anonymous, "Control unit—Wikipedia", May 8, 2017 (May 8, 2017), 9 pages, XP055673879, Retrieved from the Internet: URL: https://web.archive.org/web/20170508110348/https://en.wikipedia.org/ wiki/Control unit [retrieved on Mar. 5, 2020].

European Patent Office, Extended European Search Report for European Application No. 19212749.6 dated Mar. 18, 2020, 6 pages.

European Patent Office, Extended European Search Report for European Application No. 19212750.4 dated Mar. 18, 2020, 5 pages.

European Patent Office, Extended European Search Report for European Application No. 19212751.2 dated Mar. 18, 2020, 7 pages.

European Patent Office, Extended European Search Report for European Application No. 19212752.0 dated Mar. 18, 2020, 6 pages.

European Patent Office, Extended European Search Report for European Application No. 19214004.4 dated Mar. 18, 2020, 5 pages.

European Patent Office, Extended European Search Report for European Application No. 19213389.0 dated Mar. 18, 2020, 5 pages.

European Patent Office, Extended European Search Report for European Application No. 19212753.8 dated Mar. 18, 2020, 7 pages.

European Patent Office, Extended European Search Report for European Application No. 19212754.6 dated Mar. 18, 2020, 6 pages.

European Patent Office, Extended European Search Report for European Application No. 19212755.3 dated Mar. 18, 2020, 6 pages.

Joel Emer et al., "DNN Accelerator Architectures", CICS/MTL Tutorial, Jan. 1, 2017 (Jan. 1, 2017), XP055672691, 74 pages. Retrieved from the Internet: URL:https://www.rle.mit.edu/eems/wp-content/uploads/2017/031Tutorial-on-UNN-4-of-5-DNN-Accelerator-Architectures.pdf [retrieved on Mar. 2, 2020].

Chen Yu-Hsin et al., "Eyeriss: An Energy-Efficient Reconfigurable Accelerator for Deep Convolutional Neural getworks", IEEE Journal of Solid-State Circuits, IEEE, USA, vol. 52, No. 1, Jan. 1, 2017 (Jan. 1, 2017), pp. 127-138, XP011638633, ISSN: 0018-9200, DOI: 10.1109/JSSC.2016.2616357 [retrieved on Jan. 9, 2017].

European Patent Office, Extended European Search Report for European Application No. 19212756.1 dated Mar. 18, 2020, 7 pages.

European Patent Office, Extended European Search Report for European Application No. 18906652.6 dated Mar. 18, 2020, 5 pages.

European Patent Office, Extended European Search Report for European Application No. 19212746.2 dated Mar. 18, 2020, 8 pages.

Kalathingal Sajith et al., "Dynamic Inter-Thread Vectorization Architecture: Extracting OLP from TLP", 2016 28th International Symposium on Computer Architecture and High Performance Computing (SBAC-PAD), IEEE, Oct. 26, 2016, pp. 18-25, XP033028005, DOI: 10.1109/SBAC-PAD.2016.11.

Li et al., "Using Artificial Neural Network for Predicting Thread Partitioning in Speculative Multithreading", IEEE, 2015, pp. 823-826.

Na et al., "Speeding up Convolutional Neural Network Training with Dynamic Precision Scaling and Flexible MultiplierAccumulator", Section 2 Proposed Approach: Concept, ACM, Aug. 8-10, 2016, 6 pages.

Hanlon, Jamie, "Why is so much memory needed for deep neural networks?", URL: https://www.graphcore.ai/posts/why-is-so-much-memory-needed-for-deep-neural-networks, Jan. 31, 2017, 6 pages.

Extended European Search Report for Application No. 19215861.6 mailed May 15, 2020, 17 pages.

Extended European Search Report for Application No. 19215862.4 mailed May 15, 2020, 17 pages.

Sumina Yamashita, et al., "A Method to create illustrate images using DCGAN," JISJ SIG Technical Report, vol. 2017-MPS-112 No. 16, Feb. 27, 2017, 8 pages. (Translation of Abstract Included).

European Patent Office, Extended European Search Report for European Application No. 19218382.0 dated Apr. 24, 2020, 11 pages.

Yi Yang et al., "Deploy Large-Scale Deep Neural Networks in Resource Constrained Io T Devices with Local Quantization Region", arxiv.org, Cornell University Library, 201 Olin Library Cornell University Ithaca, NY 14853, May 24, 2018 (May 24, 2018), 8 pages, XP081234517.

Gysel Philipp et al., "Ristretto: A Framework for Empirical Study of Resource-Efficient Inference in Convolutional Neural Networks", IEEE Transactions on Neural Networks and Learning Systems, IEEE, Piscataway, NJ, USA, vol. 29, No. 11, Nov. 1, 2018 (Nov. 1, 2018), pp. 5784-5789, XP011692881, ISSN: 2162-237X, DOI: 10.1109/TNNLS.2018.2808319 [retrieved on Oct. 17, 2018].

Hsu Jeremy, "For sale: deep learning [News]", IEEE Spectrum, IEEE Inc. New York, US, vol. 53, No. 8, Aug. 1, 2016 (Aug. 1, 2016), pp. 12-13, XP011620787, ISSN: 0018-9235, DOI: 10.1109/MSPEC.2016.7524158 [retrieved on Jul. 27, 2016].

Song Mingcong et al., "In-Situ AI: Towards Autonomous and Incremental Deep Learning for IoT Systems", 2018 IEEE International Symposium on High Performance Computer Architecture (HPCA), IEEE, Feb. 24, 2018 (Feb. 24, 2018), pp. 92-103, XP033341941, DOI: 10.1109/HPCA.2018.00018 [retrieved on Mar. 27, 2018].

Kallam Suresh et al., "Evaluating the Performance of Deep Learning Techniques on Classification Using Tensor Flow Application", 2018 International Conference on Advances in Computing and Communication Engineering (ICACCE). IEEE, Jun. 22, 2018 (Jun. 22, 2018), pp. 331-335, XP033389370, DOI: 10.1109/CACCE.2018. 844167 4 [retrieved on Aug. 20, 2018].

Olariu Cristian et al., "A Cloud-Based AI Framework for Machine Learning Orchestration: A "Driving or Not-Driving" Case-Study for Self-Driving Cars", 2019 IEEE Intelligent Vehicles Symposium (IV). IEEE, Jun. 9, 2019 (Jun. 9, 2019), pp. 1715-1722, XP033606002, DOI: 10.1109/IVS.2019.8813870 [retrieved on Aug. 26, 2019].

European Patent Office, extended European search report for Application No. 19216754.2 mailed May 8, 2020, 8 pages.

Extended European Search Report for EP Application No. 19214324.6 mailed Oct. 1, 2020, 11 pages.

International Searching Authority, International Search Report for PCT Application No. PCT/CN2019/093144 mailed Oct. 9, 2019, 6 pages.

Communication pursuant to Article 94(3) EPC received for European Application No. 18861574.4, dated Jun. 2, 2022, 20 pages.

Pedro O. Domingos; An Efficient and Scalable Architecture for Neural Networks With Backpropagation Learning; 0-7803-9362 2005 IEEE; Jul. 5, 2005; 6 Pages.

(56) References Cited

OTHER PUBLICATIONS

Pedro O. Domingos, et al. "An Efficient and Scalable Architecture for Neural Networks With Backpropagation Learning" Proceedings/ 2005 International Conference on Field Programmable Logic and Applications (FPL): Tampere Hall, Tampere, Finland, Jan. 1, 2005, pp. 89-94, XP055606447, Piscataway, NJ. DOI: 10.1109/FPL.2005. 1515704 ISBN: 978-0-7803-9362-2.

* cited by examiner

PARALLEL PROCESSING OF NETWORK MODEL OPERATIONS

CROSS REFERENCE OF RELATED APPLICATION

The present disclosure is a continuation-in-part application of International Application PCT/CN2019/092805 filed on Jun. 25, 2019, and claims the benefits and priorities of Chinese Patent Application No. 201810782174.6 with the title of "Operation Device and Operation Method" filed on Jul. 17, 2018. The entire content of these applications are incorporated herein by reference in their entireties.

TECHNICAL FIELD

The present disclosure relates to the field of artificial intelligence technologies, and in particular to an on-chip code breakpoint debugging method, an on-chip processor, and a chip breakpoint debugging system.

BACKGROUND

In the prior art, there are usually a large number of operations in network models involving deep learning. For example, some of neural network operations require parallel processing. Forward operations, backward operations, weight updating, etc., require a large number of parallel operations. In a traditional parallel computing system, a processing unit needs to read and write data from a storage unit that has large memory access overhead. A large number of parallel operations may lead to high bandwidth requirements and huge energy consumption.

SUMMARY

An embodiment of the present disclosure provides a technical solution that can reduce the cost and reduce bandwidth requirements. The technical solution provides an operation device, a data processing chip, an electronic equipment, and an operation method.

According to an aspect of the present disclosure, an operation device is provided. The operation device includes: a plurality of operation modules configured to execute computational sub-commands in parallel to complete a computational operation of a network model. Each of the operation module includes:
  at least one operation unit configured to execute a first computational sub-command using first computational sub-data; and
  a storage unit at least configured to store the first computational sub-data, where the first computational sub-data includes data for executing the first computational sub-command.

In an embodiment of the present disclosure, at least two operation modules have a data connection, and one of the operation modules is configured to execute the first computational sub-command by using the first computational sub-data and second computational sub-data of the other operation module. The second computational sub-data includes data stored in a storage unit in the other operation module and/or data generated by the operation unit in the other operation module.

In an embodiment of the present disclosure, a control module is further included. The control module is configured to allocate a computational sub-command and corresponding computational sub-data to each of the operation modules according to a received computational command and computational data.

The received computational command includes a plurality of computational sub-commands, and the received computational data includes computational sub-data required for executing the computational sub-commands.

In an embodiment of the present disclosure, the control module includes:
  a first allocation unit configured to divide the computational command into a plurality of computational sub-commands according to a computational logic relationship in the computational command, and correspondingly allocate the plurality of computational sub-commands to different operation modules for operation; and
  a second allocation unit configured to determine computational sub-data required for executing the computational sub-commands, and allocate the computational sub-data to a corresponding operation module for storage.

In an embodiment of the present disclosure, the control module is further configured to selectively connect operation modules according to a computational logic relationship between the computational sub-commands.

In an embodiment of the present disclosure, the operation unit includes a network processor or a computer equipment.

In an embodiment of the present disclosure, the storage unit includes at least one of a register, a register file, and a memory array.

According to an aspect of the present disclosure, a data processing chip is provided. The data processing chip includes the operation device as described in the foregoing embodiments.

According to an aspect of the present disclosure, an electronic equipment is provided. The electronic equipment includes the data processing chip as described in the foregoing embodiments.

According to an aspect of the present disclosure, an operation method is provided. The method is applied to an operation device. The operation device includes a plurality of operation modules. The plurality of operation modules are configured to execute computational sub-commands in parallel to complete a computational operation of a network model. The method includes:
  storing the first computational sub-data by using the storage unit of an operation module, where the first computational sub-data includes data for executing the first computational sub-command; and
  using, by the operation unit of the operation module, the first computational sub-data to execute the first computational sub-command.

In an embodiment of the present disclosure, the step of using, by the operation unit of the operation module, the first computational sub-data to execute the first computational sub-command further includes:
  executing the first computational sub-command by using the first computational sub-data and the second computational sub-data of the other operation module, where
  the second computational sub-data includes data stored in a storage unit in the other operation module and/or data generated by the operation unit in the other operation module.

In an embodiment of the present disclosure, the method further includes:

allocating a computational sub-command and corresponding computational sub-data to each of the operation modules according to a received computational command and computational data, where the received computational command includes a plurality of computational sub-commands, and the received computational data includes computational sub-data required for executing the computational sub-commands.

In an embodiment of the present disclosure, the step of allocating the computational sub-command and the corresponding computational sub-data to each of the operation modules according to the received computational command and the computational data includes:

using a first allocation unit to divide the computational command into a plurality of computational sub-commands according to a computational logic relationship in the computational command, and correspondingly allocating the plurality of computational sub-commands to different operation modules for operation; and using a second allocation unit to determine computational sub-data required for executing the computational sub-commands, and allocating the computational sub-data to a corresponding operation module for storage.

In an embodiment of the present disclosure, the method further includes:

selectively connecting operation modules according to a computational logic relationship between the computational sub-commands.

In the embodiments of the present disclosure, instead of storing data required by an operation module in a memory, the data required for the operation of an operation module is stored by the storage unit of the operation module. This configuration may reduce the data access bandwidth of the operation module when the operation module accesses the storage unit and increase the data transfer speed. At the same time, since the embodiments of the present disclosure do not need a large storage device and do not need to read and write data of all operation modules, there is no need to set a storage device with large capacity and high data read and write speed, thereby reducing the cost of the storage devices.

In addition, the embodiments of the present disclosure can also improve the scalability of the operation device. A computing function of the operation device can be easily expanded by adding an operation module with a corresponding computing function.

Exemplary embodiments will be described in detail below with the accompanying drawings to make other features and aspects of the present disclosure clear.

BRIEF DESCRIPTION OF THE DRAWINGS

The drawings are included in the specification and constitute a part of the specification. Together with the specification, the drawings illustrate exemplary embodiments, features, and aspects of the present disclosure, and are used to explain the principles of the present disclosure.

DETAILED DESCRIPTION

In the prior art, there are usually a large number of operations in network models involving deep learning. For example, some of neural network operations require parallel processing. Forward operations, backward operations, weight updating, etc., require a large number of parallel operations. In a traditional parallel computing system, a processing unit needs to read and write data from a storage unit that has large memory access overhead. A large number of parallel operations may lead to high bandwidth requirements and huge energy consumption.

In view of this, an embodiment of the present disclosure provides a technical solution that can reduce cost and reduce bandwidth requirements. The technical solution provides an operation device, a data processing chip, an electronic equipment, and an operation method. The present disclosure relates to the field of data processing technologies, and in particular to an operation device, a data processing chip, an electronic equipment, and an operation method.

Exemplary embodiments and the features and aspects thereof will be described in detail below with the accompanying drawings. The same reference symbols in the drawings indicate elements with the same or similar functions. Although various aspects of the embodiments are shown in the drawings, unless otherwise noted, the drawings are not necessarily drawn to scale.

The dedicated word "exemplary" here means "serving as an example, an embodiment, or being illustrative." Any embodiment described herein as "exemplary" should not be construed as being superior or better than other embodiments.

In addition, in order to better illustrate the present disclosure, many specific details are given in the following embodiments. Those skilled in the art should understand that the present disclosure can also be implemented without some specific details. In some embodiments, the methods, means, elements, and circuits well-known to those skilled in the art are not described in detail in order to highlight the gist of the present disclosure.

An embodiment of the present disclosure provides an operation device that can be used to perform related operations of a deep learning network model, which can reduce the cost of the operation device and at the same time, reduce the bandwidth requirement for data access.

Figure 1:
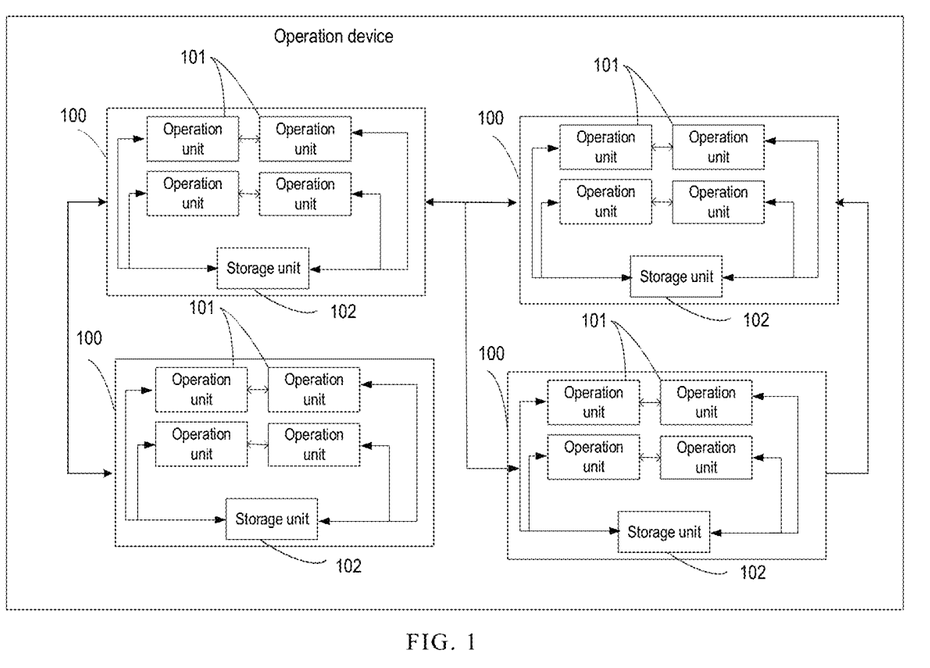
FIG. 1 is a block diagram of an operation device according to an embodiment of the present disclosure.

FIG. 1 shows a block diagram of an operation device according to an embodiment of the present disclosure. The operation device may include: a plurality of operation modules 100. The plurality of operation modules 100 can complete the computational operations of a network model by executing corresponding computational sub-commands in parallel. In other words, the operation modules 100 in the embodiment of the present disclosure can execute different computational sub-commands in parallel, and the computational sub-commands executed by the respective operation modules 100 are used to complete the operations of the network model. FIG. 1 shows an embodiment including 4 operation modules. The operation modules may be connected to each other, or some of the operation modules may be connected to other operation modules, which is not limited in the present disclosure.

The network model in the embodiment of the present disclosure may include a neural network model or may also include other network models used for machine learning. The network model may be used for machine learning or the above-mentioned neural network learning. The operation device may be used for executing the computational operations of the network model. The operation device can receive a computational command about the network model, and can generate a plurality of corresponding computational sub-commands according to the computational command. The plurality of computational sub-commands can be allocated to the plurality of operation modules 100 respectively. In other words, each of the operation modules 100 can separately execute one or more computational sub-commands, so that the relevant operations of the network model can be completed correspondingly. The computational command includes a computational operation that needs to be performed by the operation device.

When the network model includes an artificial neural network model, the computational command may include: operation information, input neuron data, weight data, and output neuron data. The operation information includes but is not limited to: a forward computational instruction or a backward training instruction, or another neural network computational instruction such as a convolution computational instruction. The embodiments of the present disclosure do not limit a specific form of the computational instruction.

As described above, the operation device in the embodiment of the present disclosure can generate a plurality of computational sub-commands based on the received computational command, and allocate a computational sub-command to each operation module 100 to perform a corresponding computational operation. Each operation module 100 includes: at least one operation unit 101 and a storage unit 102 connected to each operation unit 101. A count and type of operation units 101 in each operation module can be the same or different, which can be set according to different operation requirements. An operation unit 101 includes one or more types of multipliers and adders, an addition tree formed by the adders, an activation function unit, and a vector processing unit. In other embodiments, other operation devices may also be included. The multiplier may multiply input data 1 (in1) by input data 2 (in2) to obtain output (out) after the multiplication, where the process is expressed as: out=in1*in2. The adder may add the input data in1 through the adder to obtain output data (out). The addition tree may add the input data in1 stage by stage to obtain output data (out), where in1 is a vector of length N, N is greater than 1, and the operation process is expressed as: out=in1[1]+in1[2]+ . . . +in1[N]. The addition tree can also accumulate the input data (in1) and then adds the sum with the input data (in2) to obtain output data (out), where the process is expressed as: out=in1[1]+in1[2]+ . . . +in1[N]+in2. Or, the addition tree adds the input data (in1) and the input data (in2) to obtain output data (out), where the process is expressed as: out=in1+in2. The activation function unit may perform an activation function (active) operation on input data (in) to obtain activation output data (out), where the process is expressed as: out=active (in). The activation function (active) may include a sigmoid, tanh, relu, or softmax function, and may include another activation function. In addition to the activation operation, the activation function unit can also implement another non-linear function. An operation (f) may be performed on the input data (in) to obtain the output data (out), where the process is expressed as: out-f (in). The vector processing unit may process vector operations and/or pooling operations. Regarding the pooling operations, the vector processing unit may perform a pooling operation on the input data (in) to obtain output data (out) after the pooling operation, where the process is expressed as: out=pool (in), and pool refers to the pooling operation function. The pooling operation includes but is not limited to: mean value pooling, maximum value pooling, median value pooling. The input data (in) is data in a pooling kernel related to the output (out).

Alternatively, in an embodiment of the present disclosure, the operation unit 101 may also include an electronic equipment or device with an operation function, such as a network processor (NPU) circuit or a network processing element or a computing circuit, for executing a corresponding computational sub-command, which, however, does not place any limitation on the embodiment of the present disclosure. In an embodiment of the present disclosure, the operation unit and the storage unit in each operation module may be electronic devices arranged in an equipment or device to facilitate data transfer between the operation unit and the storage unit.

Each operation module 100 in the embodiment of the present disclosure may include at least one operation unit 101 for performing a distinct operation to complete a corresponding computational sub-command. In other words, each operation module 100 can control a separate operation unit 101 according to a received computational sub-command to perform a corresponding computational operation. For example, when the computational sub-command includes an addition instruction, the operation module may use an adder to perform an addition operation, and the like, which will not explained in detail in the embodiment of the present disclosure and can be regarded as an embodiment of the present disclosure as long as an operation program to be executed can be identified through a computational sub-command and a corresponding operation unit 101 can be used to execute the corresponding operation program.

In addition, the operation unit 101 may need to call computational data when executing a corresponding computational sub-command. For example, the operation unit 101 in the embodiment of the present disclosure can use first computational sub-data to execute a first computational sub-command, where the first computational sub-command is an instruction assigned to the operation unit 101 to execute a corresponding operation, and the first computational sub-data is the data required for executing the first computational sub-command.

When a corresponding operation command is executed through the network model, computational data related to the operation command is received. Each operation module in the embodiment of the present disclosure can correspondingly transfer the computational data to the storage unit 102 of each operation module. Alternatively, the computational sub-data may be allocated to an operation module according to a computational sub-command to be executed by each operation module 100, and the computational sub-data is at least a part of the computational data. In other words, the storage unit 102 in the embodiment of the present disclosure is at least configured to store the first computational sub-data required by an operation unit in a group of the storage unit 102. The first computational sub-data includes data for executing the first computational sub-command. The computational sub-commands executed by the respective operation modules 100 may be the same or different, and may be specifically allocated according to different operation requirements. The storage unit 102 in the embodiment of the present disclosure may include at least one of a buffer, a register, a register file, and a memory array for storing data.

Based on the above configuration of the embodiment of the present disclosure, the data required for operation can be stored by the storage unit in each operation module instead of storing the data required by each operation module in a memory, which may reduce the data access bandwidth of each operation module to the storage unit, and improve the data transfer speed. At the same time, since there is no need for a large storage device to store, read, and write the data of all operation modules, there is no need of a storage device with large capacity and high data reading and writing speed, thereby reducing the cost of the storage device.

In the embodiment of the present disclosure, the respective operation units 101 in each operation module 100 can be structured into one of an H shape, a systolic array machine shape, and a tree shape. The structure of the operation units in each operation module 100 may be the same or different. Those skilled in the art can set the structure according to requirements, which is not limited by the present disclosure. Regarding the above-mentioned types of structure, the structure of the respective operation units in the operation module will be described below.

Figure 5:
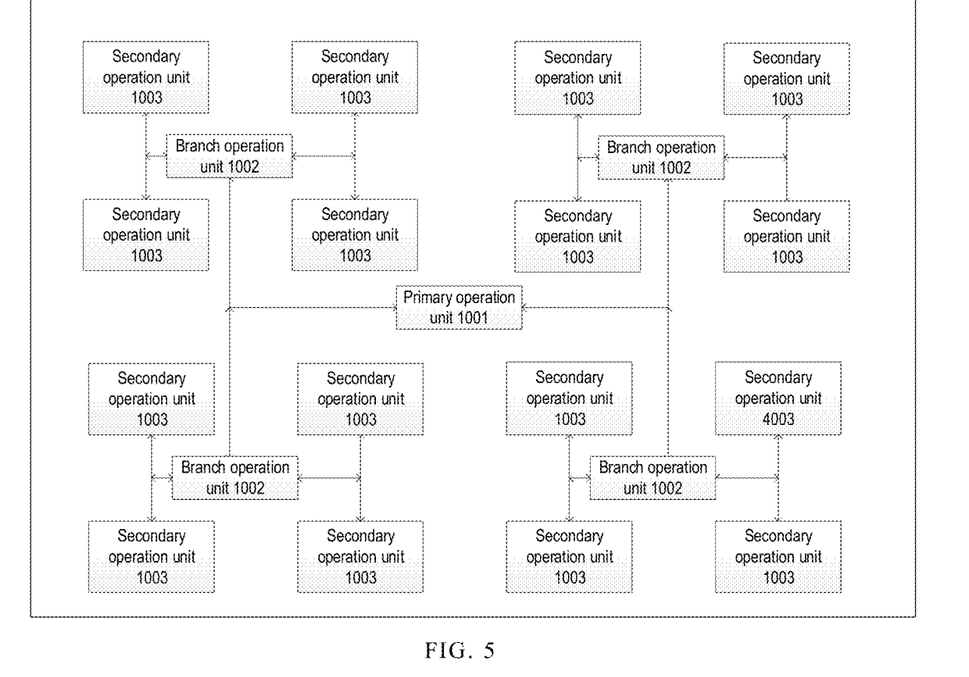
FIG. 5 is a block diagram of an operation module structured into an H shape according to an embodiment of the present disclosure.

FIG. 5 is a block diagram of an operation module structured into an H shape according to an embodiment of the present disclosure. As shown in FIG. 5, when the operation units 101 in the operation module 100 are structured into the H shape, each operation unit may include a primary operation unit 1001, at least one branch operation unit 1002, and a plurality of secondary operation units 1003. The primary operation unit 1001 can be connected to each branch operation unit 1002. The branch operation unit 1002 is respectively connected to at least one of the secondary operation units 1003. As shown in FIG. 5, the operation module includes four branch operation units 1002. Each branch operation unit 1002 is connected to four secondary operation units 1003, and the branch operation unit 1002 is configured to transfer data, instructions, and intermediate results between the primary operation unit 1001 and the secondary operation units 1003. When each branch operation unit 1002 executes a computational sub-command, the branch operation unit 1002 can perform an operation through data stored in the storage unit 102 in the module.

The primary operation unit 1001 is configured to divide a received computational operation into a plurality of computational instructions and divide computational data into a plurality of data blocks, transfer the computational instructions and the data blocks to a corresponding secondary operation unit 1003 through a branch operation unit 1002 to obtain intermediate results, and obtain a final operation result based on the intermediate results. Each of the branch operation units is configured to forward information such as data blocks, computational instructions, and weights between the primary operation unit and the secondary operation unit.

The secondary operation units 1003 can generate corresponding intermediate results after completing the corresponding computational instructions, and then transfer the intermediate results back to the primary operation unit 1001 through the branch operation unit 1002. In other words, the respective secondary operation units can execute the multiplication and accumulation of 8 sub-matrices and a weight matrix w in parallel to obtain 8 intermediate results, and transfer the 8 intermediate results to the primary operation unit 1001.

The primary operation unit 1001 can sort the 8 intermediate results to obtain a corresponding operation result, perform a bias b operation and then perform an activation operation to obtain the final result y, and transfer the final result y to the storage module 100 for storage or to another electronic device for subsequent processing. In other words, the final result y can be output or be stored in the storage unit 102.

Figure 6:
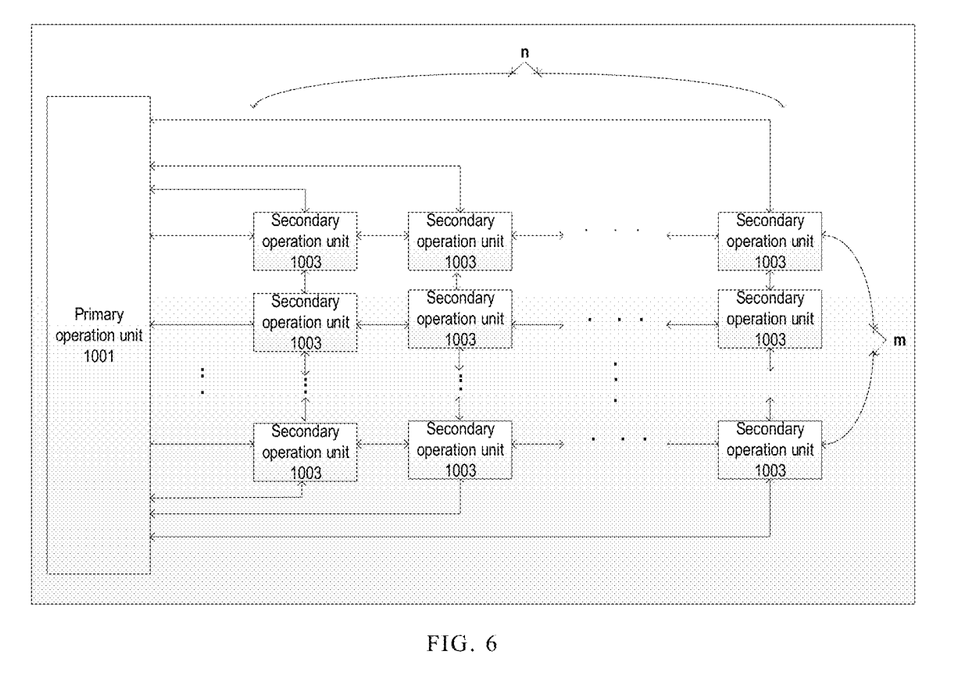
FIG. 6 is a block diagram of an operation module structured into a systolic array machine shape according to an embodiment of the present disclosure.

FIG. 6 is a block diagram of an operation module structured into the systolic array machine shape according to an embodiment of the present disclosure. When the respective operation units 101 in the operation module 100 are structured into the systolic array machine shape, each operation unit may include a primary operation unit 1001 and a plurality of secondary operation units 1003. The plurality of secondary operation units 1003 are arranged as an array, and the plurality of secondary operation units are constructed as m rows and n columns of secondary operating units, where m and n are positive integers greater than 1. Each secondary operation unit 1003 is connected to adjacent secondary operation units 1003, and the primary operation unit 1001 is connected to k secondary operation units 1003 of the plurality of secondary operation units 1003. The k secondary operation units 1003 are: n secondary operation units 1003 in a first row, n secondary operation units 1003 in an $m^{th}$ row, and m secondary operation units 1003 in a first column. It should be noted that the k secondary operation units 1003 shown in FIG. 6 only include the n secondary operation units 1003 in the first row, the n secondary operation units 1003 in the $m^{th}$ row, and the m secondary operation units 1003 in the first column. In other words, the k secondary operation units 1003 are secondary operation units 1003 that are directly connected to the primary operation unit 1001 among the plurality of secondary operation unit 1003. The k secondary operation units 1003 can be configured to forward data and instructions between the primary operation unit 1001 and the plurality of secondary operation units 1003. The remaining secondary operation units except the k secondary operation units are configured to perform operations on received data blocks according to the computational instructions to obtain intermediate results, and transfer the operation results to the k secondary operation units.

The primary operation unit 1001 can transfer assigned computational operations to the k secondary operation units 1003 to perform operations, and can be connected to the remaining secondary operation units 1003 to obtain intermediate results through the remaining secondary operation units 1003. The primary operation unit 1001 can process the intermediate results transferred by the plurality of remaining secondary operation units 1003 to obtain a final operation result, and send the operation result to the storage module 102 for storage.

Figure 7:
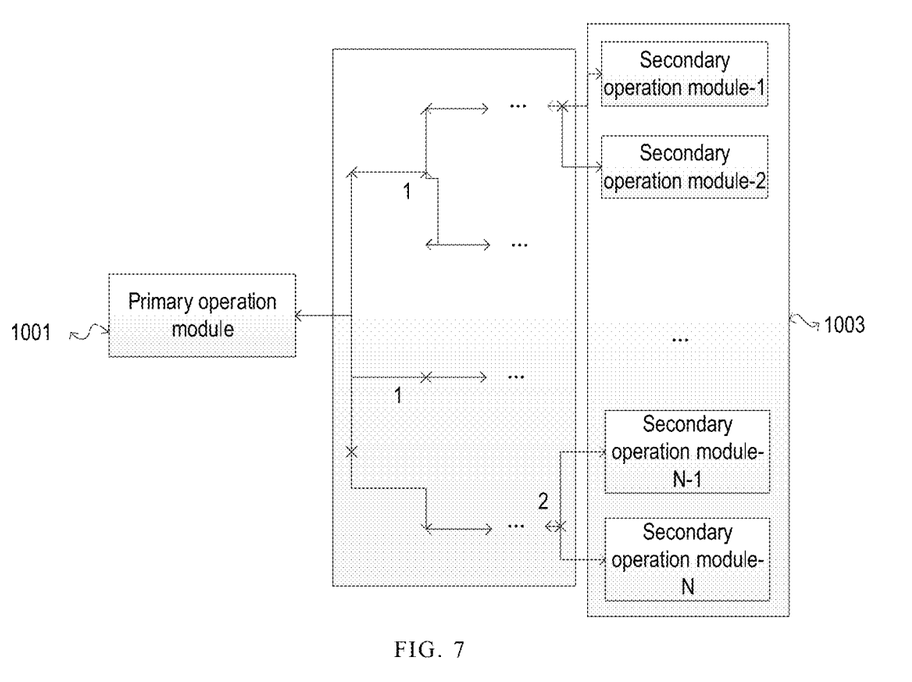
FIG. 7 is a block diagram of an operation module structured into a tree shape according to an embodiment of the present disclosure.

FIG. 7 is a block diagram of an operation module structured into the tree shape according to an embodiment of the present disclosure. When the operation units in the operation module are structured into the tree shape, the operation units may include a primary operation unit 1001 and a plurality of secondary operation units 1003, and a tree module 1004 connected between the primary operation unit 1001 and the secondary operation units. The tree module 1004 includes a root port 1 and a plurality of branch ports 2. The root port 1 of the tree module is connected to the primary operation unit 1001, and each of the plurality of branch ports 2 of the tree module is connected to a secondary operation unit of the plurality of secondary operation units. The tree module has receiving and transferring functions. FIG. 7 shows the transferring function of the tree module. In other embodiments, the tree module may also have the receiving function, which is not limited herein. The tree module 1004 can be configured to forward data blocks, weights, and computational instructions between the primary operation unit 1001 and the plurality of secondary operation units 1003. The primary operation unit 1001 can divide a received computational operation into a plurality of computational instructions and divide computational data into a plurality of data blocks, and transfer the computational instructions and the data blocks to the tree module 1004. The tree module 1004 then transfers the data, computational instructions, and weights to corresponding secondary operation units 1003, receives intermediate results from the secondary operation units 1003, and transfers the intermediate results to the primary operation unit 1001. The primary operation unit 1001 processes the intermediate results to obtain a final operation result, and sends the final operation result to the storage unit 102 for storage.

In the embodiment of the present disclosure, the tree module may include at least one layer of nodes. The nodes are structured into a line with a forwarding function. The nodes may not have a computing function. If the tree module has zero layer of nodes, the tree module is not required.

Figure 8:
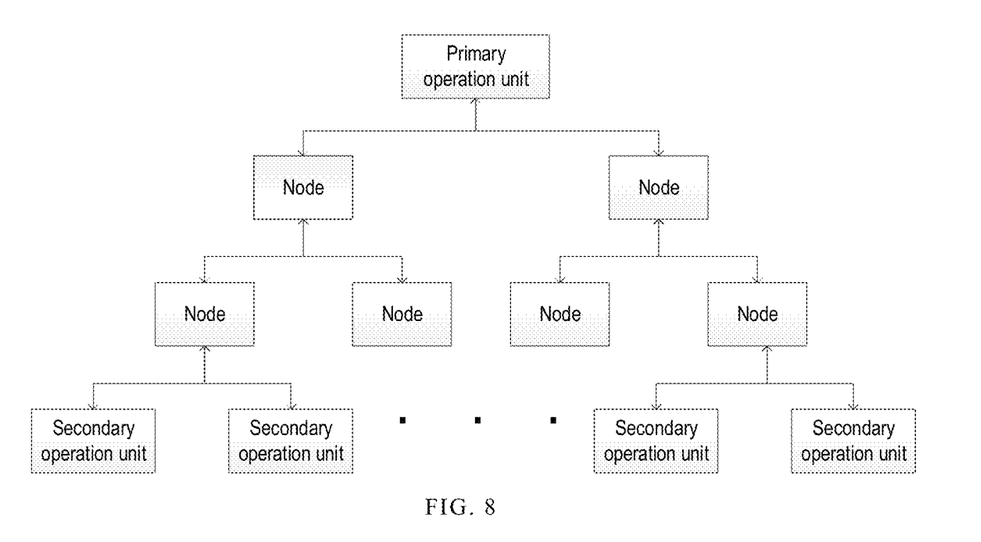
FIG. 8 is a block diagram of an operation unit structured into a binary tree shape according to an embodiment of the present disclosure.

The tree module may be structured into an n-ary tree shape. For example, FIG. 8 is a block diagram showing that the operation units in the embodiment of the present disclosure are structured into a binary tree shape. In other embodiments, the respective operation units may also be constructed as a ternary tree or an n-ary tree, where n can be an integer greater than or equal to 2. The embodiment of the present disclosure does not limit a specific value of n, the count of layers may be 2 or more. The secondary operation units may be connected to nodes of any layer except the second-to-last layer. For example, the secondary operation units may be connected to nodes of the last layer.

Besides, each of the operation units of the embodiment of the present disclosure may have an independent cache. For example, each of the operation units may include: a neuron caching unit. The neuron caching unit is configured to cache input neuron vector data and output neuron value data of the secondary operation unit.

In the embodiment of the present disclosure, the operation modules may be connected, for example, at least two operation modules may be connected. For example, data connection exists between at least two operation modules, and one of the two operation modules can execute the first computational sub-command by using the first computational sub-data and second computational sub-data of the other operation module. The second computational sub-data includes data stored in the storage unit of the other operation module and/or data generated by the operation unit of the other operation module. In other words, data connection exists between the operation modules 100 in the embodiment of the present disclosure, where the connection may be wired or wireless. A data transfer channel can be built between two operation modules based on the data connection. When an operation module 100 executes the first computational sub-command, the operation module 100 may need data generated by another operation module 100. In this case, the data transfer can be realized based on the data connection between the two operation modules.

Figure 2:
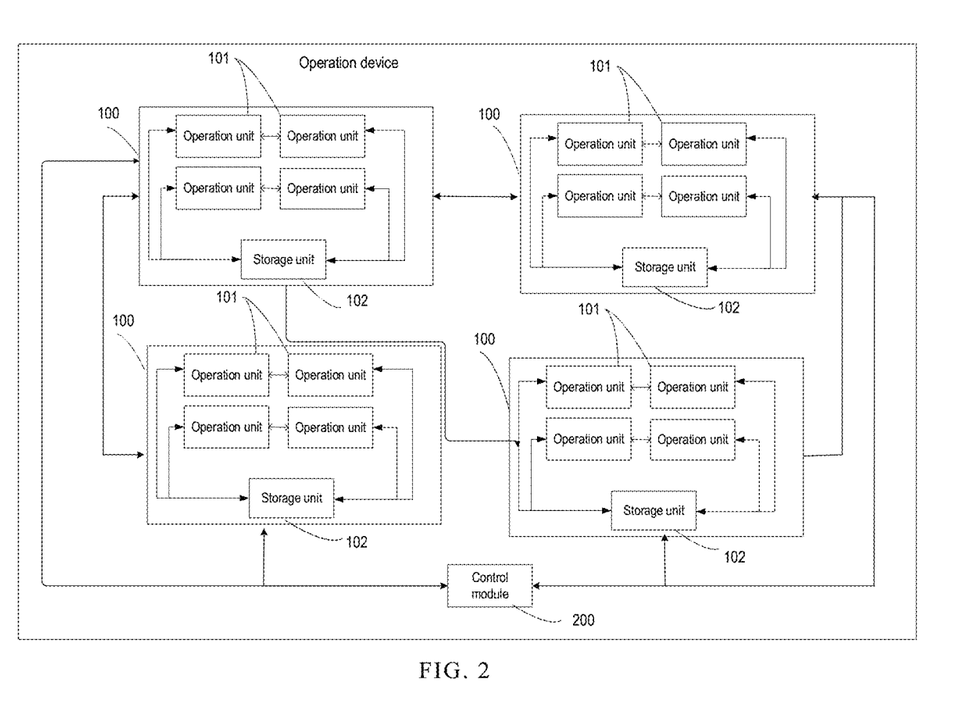
FIG. 2 is a block diagram of an operation device according to an embodiment of the present disclosure.

FIG. 2 is a block diagram of an operation device according to an embodiment of the present disclosure. Besides a plurality of operation modules 100, the operation device may further include a control module 200. The control module 200 is configured to control the operation modules to execute computational sub-commands and control a memory to store corresponding computational sub-data. The control module 200 can also control the connection status between the operation modules.

The control module 200 in the embodiment of the present disclosure can receive a computational command related to a network model. The control module 200 may receive and transfer the computational command or other information through a communication module, or the control module 200 may receive the computational command or other information directly. The communication module may include a wired communication unit and/or a wireless communication unit. The wired communication unit may perform information transfer through a wired cable, where the wired cable may include an optical fiber, a twisted pair, or a coaxial cable. The wireless communication unit may perform information transfer through wireless communication. The wireless communication unit may include a wifi module, an NFC module, and the like. Similarly, the data connection between the operation modules 100 may also be performed in a wired or wireless manner. For example, the connection may be realized by an optical fiber.

The control module 200 can allocate computational sub-commands and computational sub-data to the corresponding operation modules 100 according to the received computational command and computational data. The computational command includes a plurality of computational sub-commands for performing network model operations, and the computational data includes the computational sub-data required for executing the computational sub-commands. The control module 200 in the embodiment of the present disclosure can determine each computational sub-command and computational sub-data according to the computational logic relationship in the received computational command. For example, the control module 200 can establish a directed graph according to the logical relationship of the computational commands. The nodes of the directed graph can be used to distinguish the computational sub-commands. In other words, the computational command corresponding to the computational operation between every two nodes can be regarded as a computational sub-command. At this time, the required computational sub-data can also be determined according to the input data of the computational sub-command, so that an operation module can be allocated to execute the computational sub-command, and the computational sub-data can be allocated to the storage unit of the operation module.

In addition, the control module 200 can also determine whether each operation module needs data from another operation module when executing the corresponding computational sub-command. If the operation module needs the data from another operation module, the control module 200 establishes a connection between the two operation modules. If the operation module does not need the data from another operation module, the control module 200 does not establish a connection between the two operation modules. For example, in the embodiment of the present disclosure, a switching component can be used to connect or disconnect operation modules. In this case, the operation modules can be connected to the switching component separately. By controlling the connection of a corresponding line of the switching component, the connection between individual operation modules can be realized. With this configuration, the internal structure of the operation device can be simplified.

Figure 3:
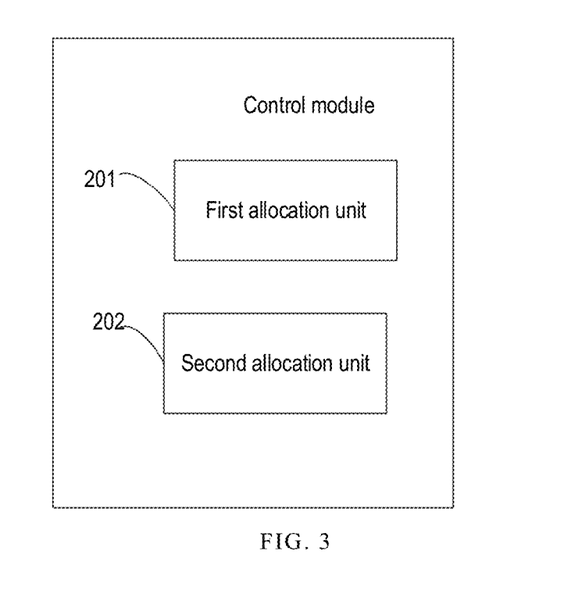
FIG. 3 is a block diagram of a control module according to an embodiment of the present disclosure.

FIG. 3 is a block diagram of a control module according to an embodiment of the present disclosure. The control module 200 in the embodiment of the present disclosure may include: a first allocation unit 201 and a second allocation unit 202.

The first allocation unit 201 is configured to divide the computational command into a plurality of computational sub-commands according to the computational logic relationship in the received computational command, and correspondingly allocate the plurality of computational sub-commands to different operation modules 100 for computation. The second allocation unit 202 is configured to determine the computational sub-data required for executing the computational sub-commands, and allocate the computational sub-data to corresponding operation modules for storage.

In other words, in the embodiment of the present disclosure, the allocation of the computational command may be performed by the first allocation unit 201, and the allocation of the computational data may be performed by the second allocation unit 202. In this way, each operation module can use the data stored in the storage unit of the operation module to complete a computational operation when executing its own computational sub-command.

To present the structural configuration of an embodiment of the present disclosure, the following examples will be used to illustrate an operation device of the embodiment of the present disclosure. The operation device includes four operation modules 100. Each operation module 100 includes one storage unit 102 and four operation units 101. For example, a first operation module 100 includes a storage unit A0 and operation units B0, B1, B11, B10; a second operation module 100 includes a storage unit A1 and operation units B2, B9, B12, B15; a third operation module 100 includes a storage unit A2 and operation units B4, B5, B6, and B7; and a fourth operation module 100 includes a storage unit A3 and operation units B3, B8, B13, B14. The operation units in each operation module 100 can be connected to each other. Operation modules 100 can be connected selectively according to the control of the control module 200.

In addition, the control module 200 may also allocate the corresponding computational sub-command to each operation module according to the received computational command and computational data, and at the same time, allocate the corresponding computational sub-data to the storage unit. Based on the configuration above, the scalability of the operation device can be achieved, and a Numa architecture of the operation device can also be realized through the setting of the various operation modules.

In summary, in the embodiment of the present disclosure, instead of storing data required by an operation module in a memory, the data required for the operation of an operation module is stored in the storage unit of the operation module. This configuration may reduce the data access bandwidth of the operation module when each operation module accesses storage unit, and increase the data transfer speed. At the same time, since there is no need for a large storage device to store, read, and write the data of all operation modules, it is not needed to set a storage device with large capacity and high data reading and writing speed, thereby reducing the cost of the storage device. In addition, the embodiment of the present disclosure can also improve the scalability of the operation device. A computation function of the operation device can be easily expanded by adding an operation module with a corresponding computing function.

It can be understood that, without violating the principle and logic, the embodiments mentioned in the present disclosure can be combined with each other to form a combined embodiment, details of which are omitted due to space limit.

In addition, the present disclosure also provides a data processing chip and an electronic equipment that include the operation device provided in any of the embodiments above, and an operation method applied to the operation device. Corresponding technical solutions and descriptions can be found in the description of the method, and are thus omitted.

An embodiment of the present disclosure also provides a data processing chip which includes the operation device as described in any of the foregoing embodiments.

In some embodiments, the present disclosure provide a chip package structure which includes the above-mentioned data processing chip.

In some embodiments, the present disclosure provide a board card which includes the above-mentioned chip package structure.

An embodiment of the present disclosure also provides an electronic device which includes the operation device or the chip or the board card as described in any of the above embodiments.

The electronic equipment may include a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device.

The vehicle may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

Figure 4:
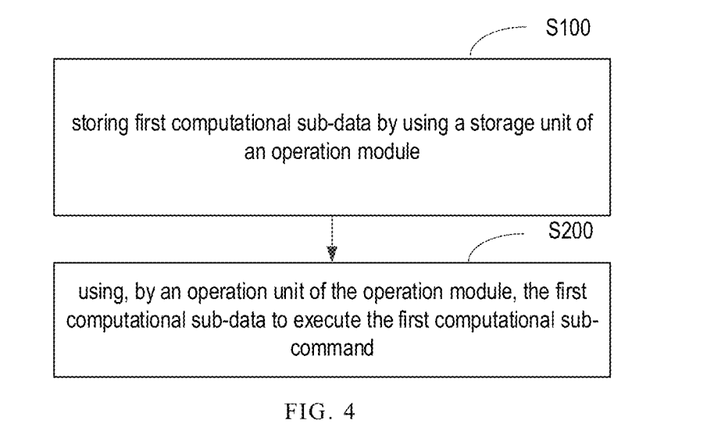
FIG. 4 is a flowchart of an operation method according to an embodiment of the present disclosure.

In addition, an embodiment the present disclosure provides an operation method. The method is applied to the operation device of any of the above-mentioned embodiments. The operation device includes a plurality of operation modules. The plurality of operation modules are configured to execute corresponding computational sub-commands in parallel to complete a computational operation of a network model. FIG. 4 is a flowchart of an operation method according to an embodiment of the present disclosure. The method includes:

S100: storing first computational sub-data by using a storage unit of an operation module, where the first computational sub-data includes data for executing a first computational sub-command; and S200: using, by an operation unit of the operation module, the first computational sub-data to execute the first computational sub-command, where the computational sub-command executed by each operation module may be different.

In the embodiment of the present disclosure, the step of using, by the operation unit of the operation module, the first computational sub-data to execute the first computational sub-command further includes:

executing the first computational sub-command using the first computational sub-data and second computational sub-data of another operation module, where the second computational sub-data includes data stored in a storage unit in another operation module and/or data generated by an operation unit in another operation module.

In an embodiment of the present disclosure, the method further includes:
allocating a computational sub-command and corresponding computational sub-data to the operation modules according to a received computational command and computational data, where
the computational command includes a plurality of computational sub-commands, and the computational data includes computational sub-data required for executing the computational sub-commands.

In an embodiment of the present disclosure, the step of allocating the computational sub-command and the corresponding computational sub-data to the operation modules according to the received computational command and the computational data includes:
using a first allocation unit to divide the computational command into a plurality of computational sub-commands according to a computational logic relationship in the computational command, and correspondingly allocate the plurality of computational sub-commands to different operation modules for operation; and
using a second allocation unit to determine computational sub-data required for executing the computational sub-commands, and allocate the computational sub-data to a corresponding operation module for storage.

In an embodiment of the present disclosure, the method further includes:
selectively connecting operation modules according to a computational logic relationship between the computational sub-commands.

It should be noted that, the foregoing embodiments of method, for the sake of conciseness, are all described as a series of action combinations, but those skilled in the art should know that since according to the present disclosure, the steps may be performed in a different order or simultaneously, the disclosure is not limited by the described order of action. Additionally, those skilled in the art should also know that the embodiments described in the specification may be optional, and all the actions and modules involved are not required for the present disclosure.

In the embodiments above, the description of each embodiment has its own emphasis. For a part that is not described in detail in one embodiment, reference may be made to related descriptions in other embodiments.

In the several embodiments provided in this disclosure, it should be understood that the disclosed device may be implemented in other ways. For instance, the embodiments above are merely illustrative. For instance, the division of the units is only a logical function division. In a real implementation, there may be another manner for division. For instance, a plurality of units or components may be combined or may be integrated in another system, or some features can be ignored or not performed. In addition, the displayed or discussed mutual coupling or direct coupling or communication connection may be implemented through indirect coupling or communication connection of some interfaces, devices or units, and may be electrical or other forms.

The units described as separate components may or may not be physically separated. The components shown as units may or may not be physical units. In other words, the components may be located in one place, or may be distributed to a plurality of network units. According to certain needs, some or all of the units can be selected for realizing the purposes of the embodiments of the present disclosure.

In addition, the functional units in each embodiment of the present application may be integrated into one processing unit, or each of the units may exist separately and physically, or two or more units may be integrated into one unit. The integrated units above may be implemented in the form of hardware or in the form of software program modules.

When the integrated units are implemented in the form of a software program module and sold or used as an independent product, they may be stored in a computer-readable memory. Based on such understanding, the technical solutions of the present disclosure can all or partly embodied in the form of a software product that is stored in a memory or storage medium. The software product includes computer instructions that enable a computer device (which may be a personal computer, a server, or a network device, etc.) to perform all or part of the steps of the methods described in the embodiments of the present disclosure. The foregoing memory includes: a USB flash drive, a read-only memory (ROM), a random-access memory (RAM), a mobile hard disk, a magnetic disk, or an optical disc, and other media that can store program codes.

A person of ordinary skill in the art may understand that all or part of the steps of the foregoing process embodiments may be carried out by a program instructing related hardware. The program may be stored in a computer-readable memory or storage medium, such as a flash disk, a read-only memory (ROM), a random-access memory (RAM), a magnetic disk, an optical disk, or the like.

The embodiments of the present disclosure have been described in detail above. Specific embodiments have been used in the specification to explain the principles and implementation manners of the present disclosure. The descriptions of the above embodiments are only used to facilitate understanding of the methods and principles of the present disclosure. Persons of ordinary skill in the art may change the implementation and application scope according to the principles of the present application. In summary, the examples of this specification should not be construed as a limitation on the present disclosure.

What is claimed is:

1. An operation device comprising a plurality of operation modules configured to execute computational sub-commands in parallel to complete a computational operation of a network model, wherein, each of the operation modules includes:
at least one operation unit configured to execute a first computational sub-command using first computational sub-data, wherein the first computational sub-command of each of the operation modules is part of the computational operation of the network model and the operation modules each execute the first computational sub-command in parallel; and
a separate storage unit configured to store the first computational sub-data, wherein the first computational sub-data includes data for executing the first computational sub-command;
wherein at least two operation modules in the plurality of operation modules have a data connection and a data transfer channel is built between the at least two operation modules based on the data connection for one of the at least two operation modules to obtain data stored in a separate storage unit of another of the at least two operation modules; and wherein the at least one operation unit in the at least two operation modules is configured to execute the first computational sub-command using the first computational sub-data and second computational sub-data, and wherein the second computational sub-data is stored in the separate storage unit of the other operation module of the at least two operation modules.

2. The operation device of claim 1, further comprising a control module configured to allocate a corresponding computational sub-command and corresponding computational sub-data to the plurality of operation modules according to a received computational command and computational data, wherein, the received computational command includes a plurality of computational sub-commands, and the received computational data includes computational sub-data required for executing the plurality of computational sub-commands.

3. The operation device of claim 2, wherein, the control module includes:

a first allocation unit configured to divide the computational command into a plurality of computational sub-commands according to a computational logic relationship in the computational command, and correspondingly allocate the plurality of computational sub-commands to different operation modules for operation, and a second allocation unit configured to determine computational sub-data required for executing the computational sub-commands, and allocate the computational sub-data to a corresponding operation module for storage.

4. The operation device of claim 2, wherein, the control module is further configured to selectively connect operation modules according to a computational logic relationship between the computational sub-commands.

5. The operation device of claim 1, wherein, the operation unit includes a network processing circuit or a computing circuit.

6. The operation device of claim 1, wherein, the storage unit includes at least one of a register, a register file, and a memory array.

7. A data processing chip comprising the operation device of claim 1.

8. An electronic equipment comprising the data processing chip of claim 7.

9. An operation method, wherein, the method is applied to an operation device, wherein the operation device comprises a plurality of operation modules configured to execute computational sub-commands in parallel to complete a computational operation of a network model, wherein at least two operation modules in the plurality of operation modules are connected by a data connection and a data transfer channel is built between the at least two operation modules based on the data connection, and wherein the method comprises:

storing first computational sub-data using a storage unit of an operation module of the at least two operation modules, wherein the first computational sub-data includes data for executing a first computational sub-command;

storing second computational sub-data using a separate storage unit of another operation module of the at least two operation modules, wherein the second computational sub-data includes data for executing the first computational sub-command; and executing the first computational sub-command by an operation unit of the operation module using the first computational sub-data and the second computational sub-data, wherein the second computational sub-data is obtained via the data transfer channel from the separate storage unit in the other operation module of the at least two operation modules.

10. The method of claim 9, further comprising:
allocating a computational sub-command and corresponding computational sub-data to the operation modules according to a received computational command and computational data, wherein, the received computational command includes a plurality of computational sub-commands, and the received computational data includes computational sub-data required for executing the computational sub-commands.

11. The method of claim 10, wherein, the allocating the computational sub-command and the corresponding computational sub-data to the operation modules according to the received computational command and computational data includes:

using a first allocation unit to divide the computational command into a plurality of computational sub-commands according to a computational logic relationship in the computational command, and correspondingly allocating the plurality of computational sub-commands to different operation modules for operation, and using a second allocation unit to determine computational sub-data required for executing the computational sub-commands, and allocating the computational sub-data to a corresponding operation module for storage.

12. The method of claim 10, further comprising:
selectively connecting operation modules according to a computational logic relationship between the computational sub-commands.

* * * * *